United States Patent [19]

Scholefield

[11] Patent Number: 5,410,752

[45] Date of Patent: Apr. 25, 1995

[54] HYBRID DATA COMMUNICATIONS SYSTEM AND METHOD EMPLOYING MULTIPLE SUB-NETWORKS

[76] Inventor: Christopher Scholefield, 11928 Sunwood Place, Delta, British Columbia, Canada, V4E 2X6

[21] Appl. No.: 953,664

[22] Filed: Sep. 30, 1992

[51] Int. Cl.$^6$ .............................................. H04B 7/26
[52] U.S. Cl. .................................. 455/33.1; 455/33.4; 455/54.1; 455/56.1; 455/67.1
[58] Field of Search .................... 455/33.1, 33.4, 51.2, 455/53.1, 54.1, 56.1, 59, 67.1; 379/59, 60; 340/825.44

[56] References Cited

U.S. PATENT DOCUMENTS

| | | |
|---|---|---|
| 4,481,670 | 11/1984 | Freeburg . |
| 4,525,861 | 6/1985 | Freeburg . |
| 4,545,071 | 10/1985 | Freeburg . |
| 4,578,815 | 3/1986 | Persinotti . |
| 4,670,906 | 6/1987 | Thro . |
| 4,829,519 | 5/1989 | Scotton et al. . |
| 5,128,934 | 7/1992 | Jasinski .......................... 455/56.1 X |
| 5,261,117 | 11/1993 | Olson ............................. 455/56.1 X |

Primary Examiner—Reinhard J. Eisenzopf
Assistant Examiner—Chi Pham
Attorney, Agent, or Firm—Charles W. Bethards

[57] ABSTRACT

A method and apparatus for combining multiple MFR subnetworks (15) and SFR subnetworks (17) to provide seamless data communications throughout a geographic area (13) wherein a portable station (61) receives a first data message stream (101) for a first time period (153) that exceeds a retransmission interval (115) and under appropriate data path quality conditions monitors a second data message stream (121) for a second time period (155) that is less than the retransmission interval (115) to identify alternative data paths with acceptable quality conditions that may be used for further data message delivery to the portable station (61).

6 Claims, 4 Drawing Sheets

HYBRID DATA COMMUNICATIONS SYSTEM AND METHOD EMPLOYING MULTIPLE SUB-NETWORKS

FIELD OF THE INVENTION

This invention relates to radio data communications systems including but not limited to data message delivery within such systems.

BACKGROUND OF THE INVENTION

As our society becomes more mobile and information dependent the demand for untethered data communications continues to grow. A proliferation of radio data communications systems have been, are being, or will be deployed in an attempt to satisfy this demand. To no ones surprise, these systems, while often occupying or providing coverage to overlapping geographic areas and user groups, do not always lend themselves to providing alternative seamless data message delivery service to a particular user's terminal.

The systems, as deployed and planned, have sought to optimize different criteria depending on the system designers perception of what user groups needs are intended to be addressed by a particular radio data communications system. Such criteria have included various combinations of data message delivery capacity and delivery reliability, conservation of radio frequency spectrum, system deployment economics, and the extent of the desired geographic coverage. The process of optimization often relies on or takes advantage of expected or measured characteristics and content of data messages that are representative of probable system traffic. As a result of the above considerations at least two distinct types of systems, often referred to as a single frequency and multiple frequency reuse systems respectively, have evolved to provide data message delivery to user groups throughout a geographic area.

While distinct, both systems include some similar elements, functions, or characteristics. For example, both systems (networks) likely are centrally managed under the control of a network controller and include a plurality of fixed (base) stations arranged and managed to provide data message delivery to portable stations (portable or mobile terminals) throughout a geographic area. The network controller includes, among others, a data message routing function for selecting the appropriate path to attempt a data message delivery to a particular portable station. This path selection will depend in part on an estimate of the geographic location of the particular portable station or other system activity and may include when to attempt a data message delivery, which base station to utilize, and therefore, or additionally, which radio channel (a radio channel may represent two radio frequencies, one for receive and one for transmit).

One of these systems, referred to as a multi-frequency reuse (MFR) system, is characterized by typically comparatively small coverage areas with adjacent areas employing different radio channels, thus frequencies, and spatially distant areas reusing the same radio channels. The areas in total provide coverage throughout the intended MFR geographic area. Ordinarily the fixed stations, at least one per area, in this system are continuously transmitting and receiving and portable stations are capable of operating on any legitimate network channel. The portable stations, by scanning the network channels, etc., can determine or aid in determining there location within the intended MFR geographic area by observing the better quality channels based on signal strength, error rates, etc. The MFR network, although using several radio channels and thus frequencies, can provide significant data message delivery capacity since all areas may be simultaneously and independently active. Said another way, any path within the MFR system will, at least in principle, have a unique radio channel, i.e. frequency.

The second system, referred to as a single frequency reuse (SFR) system, is characterized by a multiplicity of coverage areas where all areas and potential paths are served by the same radio channel. As above, the areas in total provide coverage throughout the intended SFR geographic area. The fixed stations, usually one per area, in the SFR system are not ordinarily all simultaneously and independently active. To demonstrate, since all areas and paths operate on the same radio channel any two or more areas, when simultaneously active (respective fixed stations transmitting), will have an interference region. This region's geographic size and boundary will depend in part on the spatial separation, radio power levels, etc., of the respective base stations. Within this interference region a given portable station likely cannot resolve (successfully receive) a data message from either of the stations.

In essence the effective coverage area depends at least in part on activity within other areas of the SFR system. Portable stations used in the SFR system need only operate on the assigned channel for the network and will not be able to directly aid in determining their location within the intended SFR geographic area unless and until the appropriate fixed station is enabled and uniquely identified. The SFR network tends to be viewed as a spectrally efficient and cost effective approach to providing coverage to a comparatively large geographic area. This follows from the limited number of frequencies employed and comparative simplicity of the portable stations, etc. Somewhat offsetting the above noted attributes, resulting from the single channel, interference regions, etc., a SFR system will typically have relatively limited data message delivery capacity and often more complicated data message routing functions.

These differences in data communications networks have here-to-fore made it impossible or unduly burdensome to provide alternative seamless data message delivery to a particular user from either of the two types of systems. It is not economically effective or ergonomically practical for a user to carry two portable stations, one each configured to operate on each system. Manual selection of the appropriate system at a portable station configured to operate on either system, while possible, does not assure seamless (at least in time if at all) coverage to the user. Therefore an urgent need exists, that is becoming more evident, for inventive data communications that automatically provide seamless data message delivery to a user regardless of network configuration.

SUMMARY OF THE INVENTION

This invention addresses the aforementioned needs by teaching a radio data communications system operating on multiple radio frequencies and coordinated by a network controller, where the system is adapted for data message delivery to portable stations throughout a geographic area and includes a first sub-network function, coupled to the network controller and operating in a multi-frequency reuse mode, for transmitting a first data message stream that includes multiple transmissions of a data message temporally spaced by a retransmission interval and a second sub-network function, coupled to the network controller and operating in a single frequency reuse mode, for transmitting a second data message stream. Further included is a receiving circuit for receiving the first data message stream for a first time period that exceeds the retransmission interval, assessing a first data error rate, and, when the first data error rate satisfies a search threshold, temporarily receiving the second data message stream for a second time period that is less than the retransmission interval, thus assuring that no more than one of the multiple transmissions occur during the second time period.

A further embodiment of the instant invention in a radio dam communications system adapted for data message delivery to portable stations throughout a geographic area, is a method including the steps of receiving a first data message stream for a first time period, the first data message stream including multiple transmissions of a data message temporally spaced by a retransmission interval that is less than the first time period; assessing a data error rate of the first data message stream; and monitoring, when the data error rate satisfies a search threshold, a second data message stream for a second time period that is less than the retransmission interval, thus assuring that no more than one of said multiple transmissions occur during said second time period.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

DETAILED DESCRIPTION OF A PREFERRED EMBODIMENT

Figure 1:
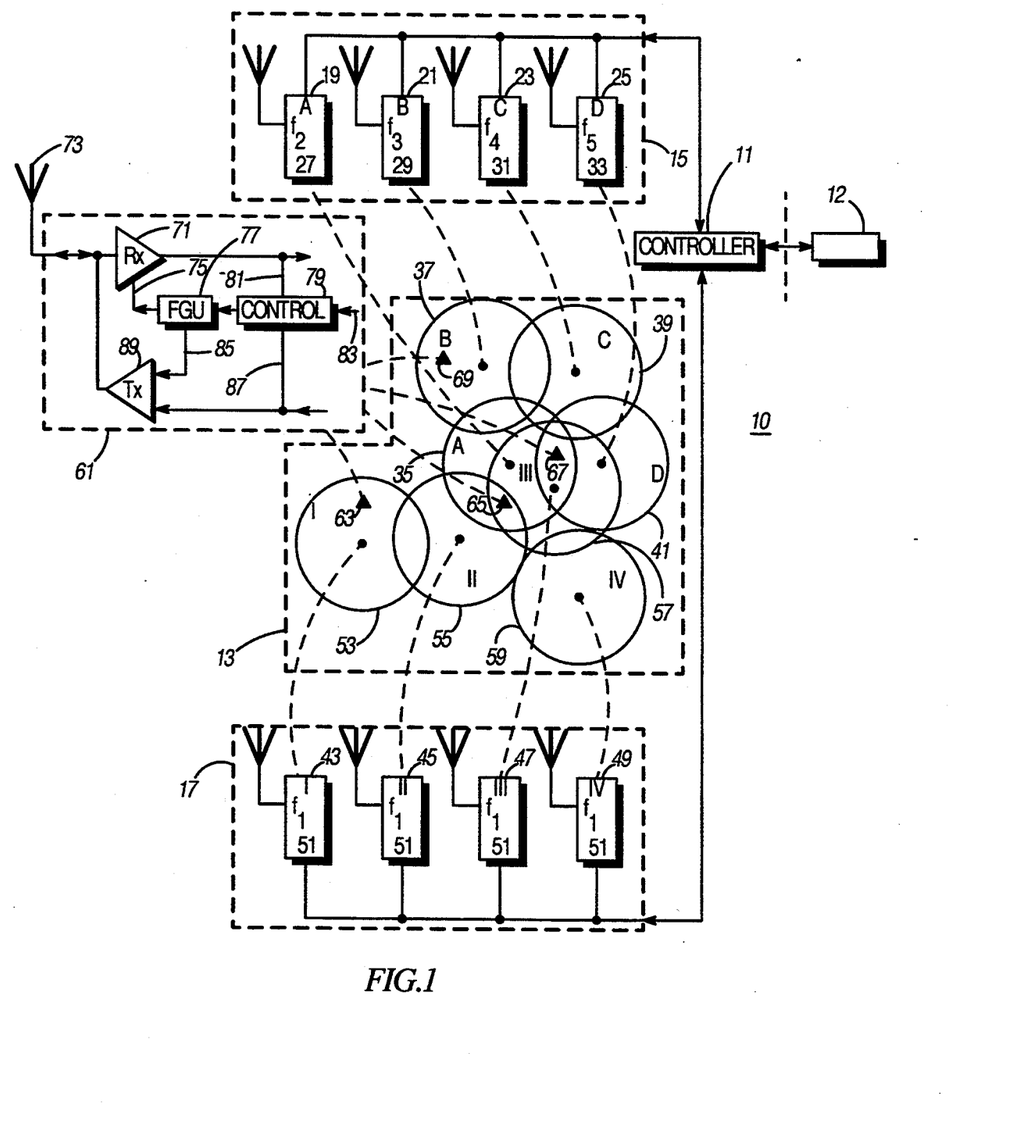
FIG. 1 is a representative diagram of a data communications system in accordance with the present invention.

Referring to FIG. 1, an exemplary radio data communications system (10) is coupled, by way of an included network controller (11), to a data message source (12), for example a public switched data network or dispatch center, and is adapted for data message delivery throughout a geographic area (13). The system (10) is coordinated by a network controller (11) that is coupled to a first subnetwork (15), and a second subnetwork (17). The first subnetwork (15), comprised of fixed stations A through D (19, 21, 23, & 25) operating, respectively, on channels f2, f3, f4, and f5 (27, 29, 31, & 33) within, respectively, corresponding and like designated coverage areas A through D (35, 37, 39, & 41), is cooperatively operating in a MFR mode. The second subnetwork (17), comprised of fixed stations I through IV (43, 45, 47, & 49) all operating on channel f1 (51) within, respectively, corresponding and like designated coverage areas I through IV (53, 55, 57, & 59), is cooperatively operating in a SFR mode. The first and second subnetworks (15 & 17) coordinated by the network controller (11) provide data message delivery to and from portable stations (61) throughout the geographic area (13) encompassed by coverage areas A through D (35, 37, 39, & 41) and I through IV (53, 55, 57, & 59). By observation, SFR coverage areas II and III (55 & 57) partially overlay MFR coverage areas A and D (35 & 41 ). The coverage areas of FIG. 1 including the number and arrangement of such areas have been selected, with an eye to simplicity, for the purposes of advancing the understanding and appreciation of the instant invention and in no way are intended to limit such invention or otherwise reflect any actual or practical data communications system. Practical radio data communications systems in accordance with the instant invention may include some combination of a plurality of MFR and SFR subsystems. Practical coverage areas typically have less definitive boundaries and more variation in size due either to plan or the vagaries of radio frequency propagation.

For demonstrative purposes, FIG. 1 shows four portable stations (61) deployed, respectively, at locations (63, 65, 67, & 69). The portable stations (61) include a receiver (71), coupled to an antenna (73), for receiving a data message stream originating from one or more of the fixed stations A through D (19, 21, 23, & 25) and I through IV (43, 45, 47, & 49) on a corresponding radio channel. The receive frequency of the radio channel that the portable station (61) is operating on is determined by a receive injection signal coupled to receiver (71) and produced, at output (75), by a frequency generating unit (FGU) (77), for example a frequency synthesizer. The data message stream or appropriate decoded portions thereof is further coupled to a controller (79), such as a microprocessor based logic unit, at input (81). Based on various, for example software, algorithms, user inputs at input (83), or commands included within the received data stream, the controller (79) will direct, by for example programming instructions, the FGU(77) to produce the appropriate receive injection signal at output (75). Similarly the controller (79), as required, may direct production of a transmit injection signal that is coupled from output (85) together with other control and data information from controller output (87) to a transmitter (89). The transmitter (89) is in turn coupled to antenna (73) and thus via radio wave to the appropriate fixed station A through D (19, 21, 23, & 25) or I through IV (43, 45, 47, & 49). Thus the controller (79) determines the operating radio channel and hence path of the portable station (61).

Figure 2:
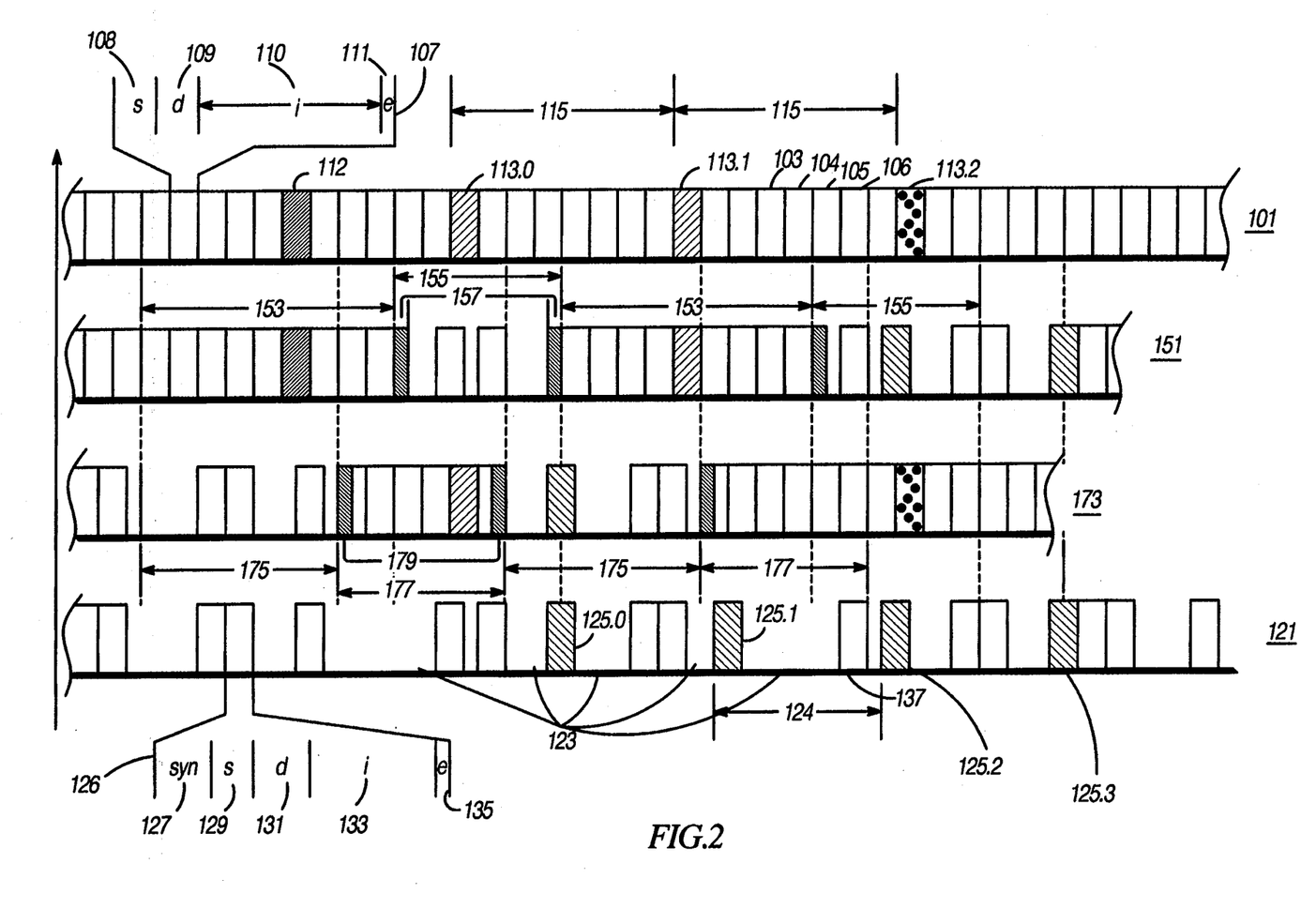
FIG. 2 is a representative data structure diagram for a system operable in accordance with the present invention.

Referring to FIG. 2, a data message stream (101) is depicted. This data message stream (101) is exemplary of such a stream as transmitted by each of the MFR fixed stations A through D (19, 21, 23, 25). Consider the portable stations within coverage area A (35), for example the portable station (61) at location (65), properly operating on channel f2 (27) and receiving the data message stream (101) as emanating from (being transmitted by) the fixed station (19). The data message stream is comprised of a continuous stream of data messages (. . . 103, 104, 105, 106, . . . ) each of which, for example, may be a data or control message directed to a particular portable station, control or overhead messages directed to all portable stations, or overhead or filler messages, indicative of an absence of useful content, directed to no portable stations. One such message (107) is representative of many MFR type data messages and includes a synchronization field (108), a destination field (109), an information field (110), and an, explicit or implicit, end-of-message indication (111). The destination field of a data message directed to a particular portable station will include an address corresponding to such portable station.

One additional attribute of many data communications systems, demonstrated by FIG. 2, is the multiple transmission or retransmission approach to achieving a higher degree of data message delivery reliability. With this approach a portable station acknowledges (not specifically shown), on the portable station transmit frequency of the corresponding radio channel, successfully receiving a data message or else the data message is retransmitted a predetermined number of times, for example five. In FIG. 2 the shaded data message (112) has been acknowledged as this message has not been retransmitted (repeated) in the data message stream (101). In contradistinction, data message (113) was originally unsuccessfully transmitted (113.0) as evidenced by the subsequent retransmission (113.1) which, in mm was successful (presuming the predetermined number of repeats exceeds two) as evidenced by the absence of a second retransmission (113.2). These retransmissions are temporally spaced (spaced in time) by a subnetwork dependent predetermined retransmission interval (115).

FIG. 2 additionally depicts another data message stream (121), intended to be representative of the data message traffic observed on a SFR frequency by a portable station operating for example on channel f1 (51) in the radio data communications system (10). As depicted and consistent with the observation that a particular fixed station such as fixed station I, II, III, or IV (43, 45, 47, or 49) in the SFR subnetwork (17) is not continuously transmitting as all potential paths use the same frequency, here f1 (51), the individual data messages of the data message stream (121) are sporadically received intermingled with periods of inactivity (123). The SFR subnetwork (17) like it's MFR counterpart, while possibly varying the retransmission interval (124) and number of retransmissions, will take advantage of multiple retransmissions (125) to enhance data message delivery reliability.

The data message stream received by any particular portable station (61) will depend on that stations actual location. For example a portable station (61) deployed at location (65) of FIG. 1 will receive a data message stream representative of a composite of the data messages transmitted by fixed stations II and III (45 & 47) since the coverage areas for these fixed stations overlap at location (65) in the representative data communications system (10). If and when fixed stations II and III (45 & 47) are simultaneously active, the composite data message stream available at location (65) likely can not be successfully received (not specifically depicted in FIG. 2). On the other hand from a positive perspective, the portable stations within the interference region comprised of the overlapping area of coverage areas II and III may be served by either of two possible paths, i.e. those originating at either fixed stations II or III (45 or 47). The path selection is controlled by the network controller (11) and constrained by other activity within the SFR subnetwork (17), for example coverage area I or IV (53 or 59). Furthermore and key to a need resolved by an embodiment of the instant invention, the portable station (61) at location (65) in theory may be provided data message delivery service by the MFR subnetwork (15), specifically fixed station (19), since location (65) also lies within the corresponding coverage area A (35).

The individual data messages within the SFR data message stream (121) will often have similar content and purpose to those utilized in an MFR subnetwork with differences including data message length and those discussed below. A representative SFR data message (126) includes a synchronization field (127) that may be somewhat longer than such MFR synchronization field (108) due to the discontinuous operating characteristics of an SFR subnetwork (17) and hence requirement to establish bit synchronization on a sporadic basis, a source field (129) indicative of a unique source for the data message (126), here fixed station II or III (45 or 47) given the portable station (61) is at location (65) and required because the operating frequency (51) is independent of location in the SFR subnetwork (17), a destination field (131), an information field (133), and an, explicit or implicit, end-of-message indication (135). Certain embodiments of the instant invention contemplate, in the absence of normal data message traffic for a predetermined time period, a corresponding "forced" SFR filler message (137) from each SFR fixed station. This filler message would include the synchronization field (127) and source field (129) and may be used by portable stations within the corresponding coverage area to evaluate the merits (quality) of the path originating at a particular fixed station.

In operation the data communications system (10) will attempt a data message delivery to a particular portable station (61), at least in the first instance, over a particular path originating with a fixed station included in a particular subnetwork. Such subnetwork is referred to herein as the registered subnetwork and action taken by a portable station to acquire or change a registered subnetwork is referred to as registration, registering on a subnetwork, or the like. A portable station (61) that may take advantage of the instant invention must include the capability to operate on channels corresponding to more than one subnetwork, for example f1 and f2–f5 (51 & 27–33). Further, such portable station needs the capability to evaluate the quality of a particular path by, for example, assessing a data error rate, or reasonable equivalence, such as signal strength or signal to interference ratio, of a data message or a data message stream.

The data error rate may be assessed by, for example, comparing a portion of a decoded data message available at input (81) of controller (79) to a predetermined bit pattern, selected from a set of valid patterns that corresponds to a respective subnetworks protocol, for example, a synchronization bit pattern associated with the synchronization field(s) (108, 127) or other predetermined bit pattern of sufficient length. Under appropriate assessed data error rate circumstances, discussed herein below, the portable station, via the portable station transmit frequency and a control data message, will undertake registration on a subnetwork. Such registration functionally includes notifying the data communications network (10) that a data path has acceptable quality and that future data message deliveries may be attempted on the corresponding registered subnetwork.

By way of example with reference to FIG. 2., consider a resultant data message stream (151) as received by the portable station (61) at location (65) while registered on the MFR subnetwork (15) and operating in accordance with an embodiment of the instant invention. The resultant data message stream (151) provided by receiver (71) at input (81) of controller (79) is a combination of a first data message stream, here data message stream (101) as transmitted by a first subnetwork, here MFR subnetwork (15), and a second data message stream, here data message stream (121) as transmitted by a second subnetwork, here SFR subnetwork (17). The resultant data message stream (151) arises because the receiver (71) as directed by the controller (79) is alternately operating on differing subnetwork channels, here the MFR channel f2 (27) for at least a first time period (153) and, when circumstances are appropriate, the SFR channel f1 (51) for a second time period (155) that includes initially and finally a switching time (157).

The switching time (157) will vary in duration depending on the portable station's (61) particular characteristics such as a frequency synthesizer's loop bandwidth, etc. and represents the amount of time required for the portable station to switch between two channels. The first time period (153) is selected to exceed the retransmission interval (115) that corresponds to the first data message stream, here data message stream (101) and the second time period (155) is selected to be less than the retransmission interval (115). By such selection no more than one transmission of a data message, for example (113.0), intended for a particular portable station (61) may occur during the second time period (155). Given such an occurrence and selection of time periods the data message (113.0) may be successfully delivered on the next, here the first, retransmission (113.1).

Operating in accordance with the above, a portable may receive intended data messages on a registered subnetwork during a first time period and evaluate other possible subnetworks, specifically paths, during the second time period. Specifically here, where the other subnetwork is a SFR subnetwork and hence subject to periods of inactivity, the contemplated "forced" SFR filler message(s) (137) allow an evaluation of potential paths even during such periods of inactivity. Thus, in exchange for some data message delivery reliability or decrease in capacity of a subnetwork due, in effect to fewer total available retransmissions or alternatively some increase in the frequency of required retransmissions, an advantage of the instant invention, specifically seamless data message delivery from multiple subnetworks, may be practiced.

As a further example with reference to FIG. 2., consider a resultant data message stream (173) as received by the portable station (61) at location (65) while registered on the SFR subnetwork (17) and operating in accordance with an embodiment of the instant invention. The resultant data message stream (173) provided by receiver (71), as explained above, is a combination of a first data message stream, here data message stream (121) as transmitted by a first subnetwork, here SFR subnetwork (17), and a second data message stream, here data message stream (101) as transmitted by a second subnetwork, here MFR subnetwork (15). The resultant data message stream (173) arises because the receiver (71), as above, is alternately operating on differing subnetwork channels, here the SFR channel f1 (51) for at least a first time period (175) and, when circumstances are appropriate, the MFR channel f2 (27) for a second time period (177) that includes initially and finally a switching time (179) that for a particular portable station (61) for the reasons outlined above, may be equivalent in duration to switching time (157).

The first time period (175) is selected to exceed the retransmission interval (124) that corresponds to the first data message stream, here data message stream (121) and the second time period (177) is selected to be less than the retransmission interval (124). By such selection, as noted above, no more than one transmission of a data message, for example (125.1), intended for a particular portable station (61) may occur during the second time period (177). In sum, similar to above, the advantages of the instant invention may thus be practiced.

Figure 3:
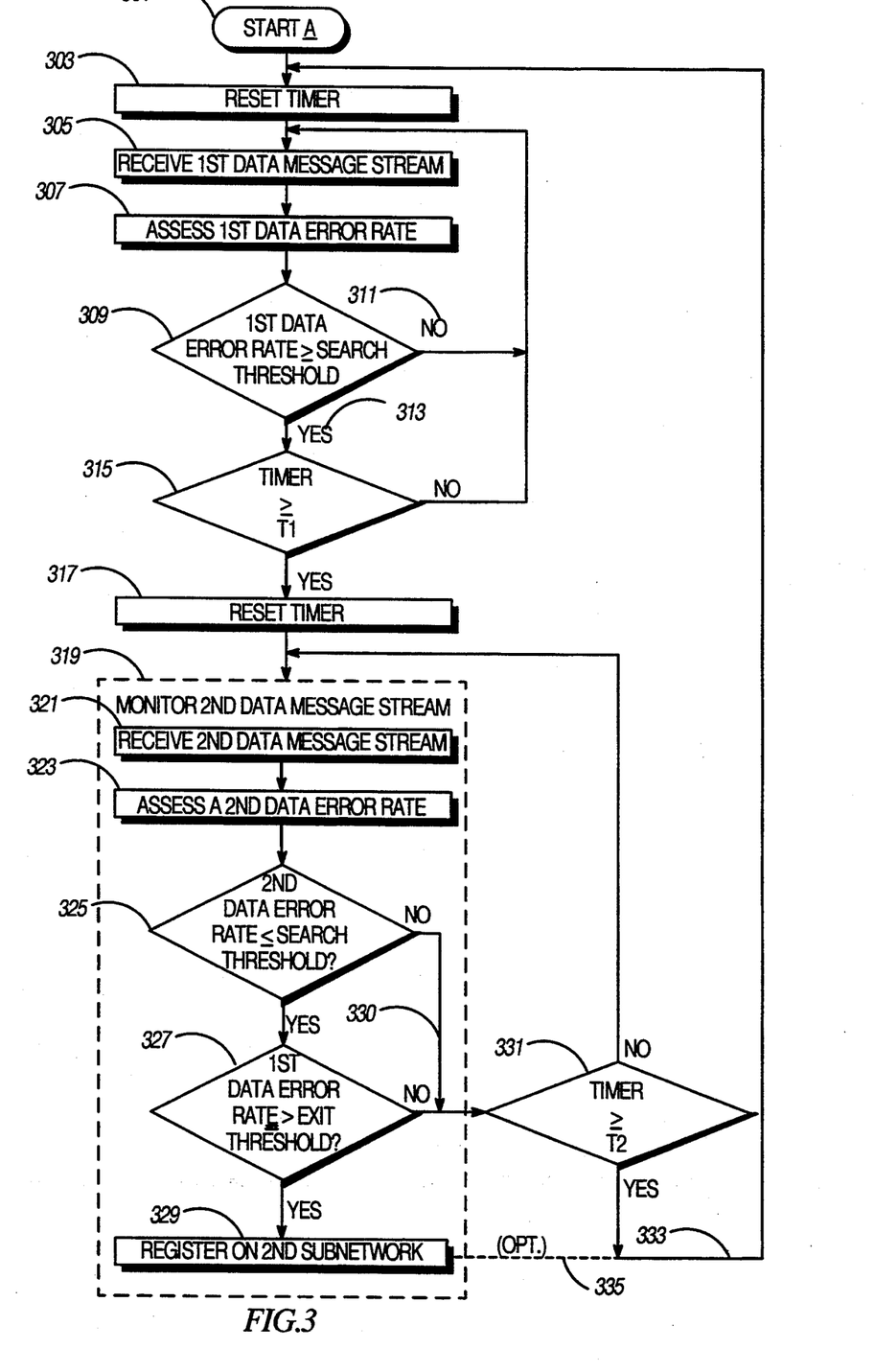
FIG. 3 is a demonstrative flow chart of one embodiment of the instant invention.

Referring additionally to the FIG. 3 flowchart a process embodiment of the instant invention is demonstrated. This process is suitable for execution by the portable station (69) including, for example, software programs executed by a microprocessor portion of the controller (79). Besides FIG. 3 the reader will be referred to FIG. 2 from time to time where such reference will enhance an understanding and appreciation of the instant invention. The flow chart, beginning at A (301), includes resetting a timer at step (303), and continues with receiving a first data message stream at step (305), for example data message stream (101), assessing a first data error rate, explained above, at step (307) and testing the first data error rate against a search threshold at step (309). Such search threshold may, for example, be $10^{-3}$ errors per bit and will among other considerations depend on the specific subnetworks error correction coding parameters. If the first data error rate does not satisfy the search threshold the flow chart following an "N" path (311) loops back and continues receiving a first data message stream at step (305).

However, when the first data error rate satisfies the search threshold at step (309), such condition being indicative of poorer, possibly worsening corresponding data path quality, "Y" path (313) is taken to step (315), where the timer value is tested to determine whether a first time period (153) has elapsed (timer≧t1). From above, this first time period is selected to be longer than the corresponding retransmission interval (115) and hence assure the opportunity to receive any retransmission of a data message where the original transmission of the data message may have been unsuccessful because missed. If not, the flow again loops back to receiving a first data message stream at step (305), and if so, subsequent to resetting the timer at step (317), monitoring a second data message stream begins at step (319). The beginning of step (319) corresponds to the end of the first time period (153) and the beginning of the second time period (155) associated with the resultant data message stream (151) of FIG. 2.

Step (319) includes receiving a second data message stream, for example the data message stream (121) at step (321), assessing a second data error rate at step (323), and deciding whether the second data error rate satisfies a search threshold at step (325). Such search threshold, here for the sake of simplicity assumed equivalent, may in practice vary from the equivalent threshold of step (309) due either to design objectives or a specific subnetworks error control parameters. When the search threshold is satisfied at step (325), indicating the second data message stream includes a path with at least acceptable, possibly improving quality, the first data error rate of step (307) is further compared to an exit threshold at step (327). The exit threshold, again, depends on among others a subnetworks error control parameters, etc. but for example may be $10^{-2}$ errors per bit. When the step (327) conditions are satisfied, indicating a different path is required with some urgency, registration on the second subnetwork is undertaken at step (329). Upon registration the portable station (61) may, for example, remain monitoring the second data message stream for data messages intended for the portable station (61) or optionally as indicated by flow line (335) return to the beginning of the flow chart and start anew at step (303) or await a control message from the network controller that may, for example, confirm the registration and direct the portable station to the second subnetwork, etc.

When neither step (325) nor step (327) are satisfied the path(s) labeled "N" (330) are followed to step (331) where the timer is tested to determine whether a second time period has elapsed (timer≧12). Ignoring one switch time (157) this second time period of step (331) is, for example, the equivalent of the second time period (155) of FIG. 2 and is selected according to the above identified constraints. If the timer condition of step (331) is not fulfilled the flow loops back and receiving a second data message stream is continued at step (319). Alternatively, when the timer condition of step (331) is fulfilled the path labeled "Y" (333) is taken back to step (303) where the process may begin anew. FIG. 3 is an exemplary embodiment of the instant invention allowing a managed transfer of portable stations and corresponding data message traffic when it appears to be necessary. This may be particularly advantageous when the original registered subnetwork is an MFR subnetwork with reasonable capacity and the second subnetwork is an SFR subnetwork with comparatively more limited capacity. Referring to FIG. 1, such circumstances may be encountered, for example, if a portable station traveled from location (69), served by the MFR subnetwork, to location (65), served by either subnetwork, and thereafter further to location (63), served only by the SFR subnetwork.

Figure 4:
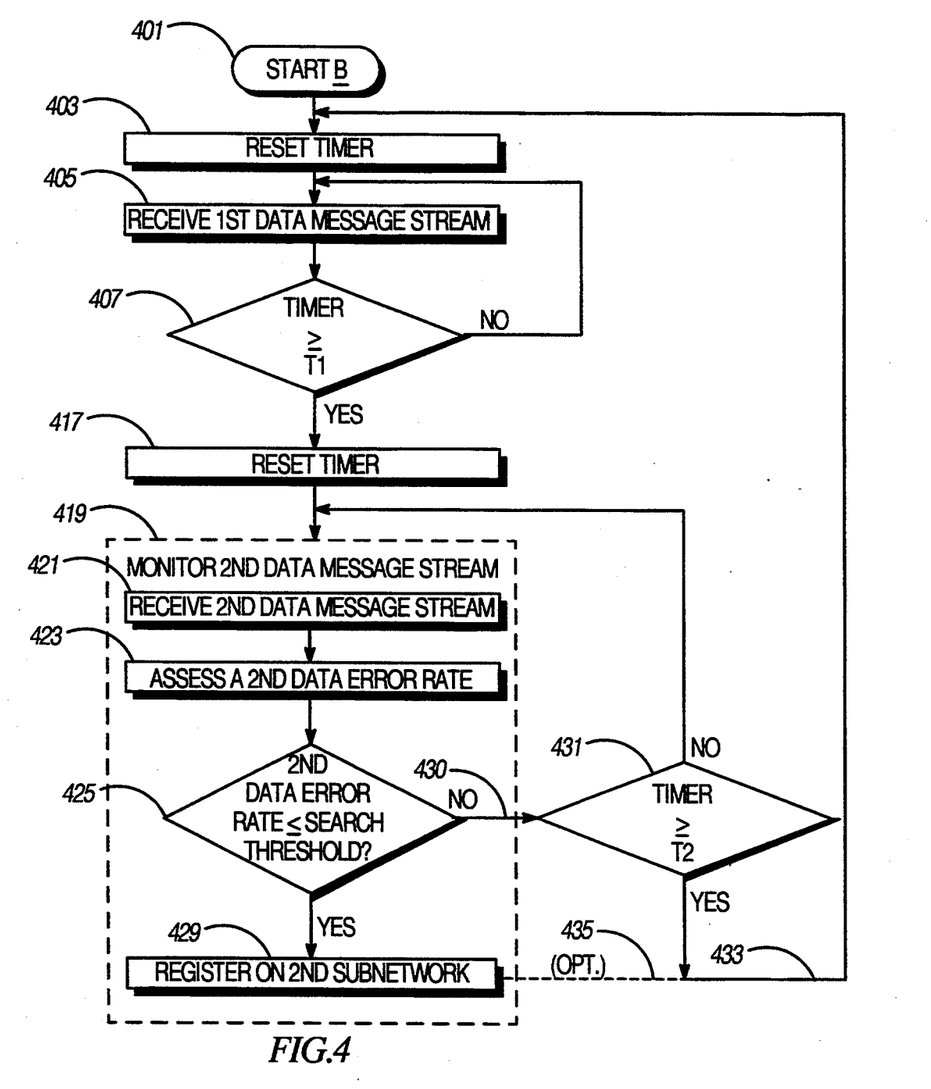
FIG. 4 is a demonstrative flow chart of a further embodiment of the instant invention.

Referring now to the FIG. 4 flow chart, a similar, in some sense simplified, but nevertheless distinct and important embodiment of the instant invention is demonstrated. This embodiment is particularly adapted for proactively directing data message delivery to a subnetwork, such as a MFR subnetwork, that may, at least statistically, have significant available capacity and thereby concomitantly reducing the traffic on a more limited capacity subnetwork, such as a SFR subnetwork. This process, like FIG. 3, is suitable for execution by a microprocessor portion of the controller (79) via software programs. Besides FIG. 4 the reader will be referred to FIG. 2 from time to time where such reference will enhance an understanding and appreciation of the instant invention. The FIG. 4 flow chart, beginning at B (401), includes resetting a timer at step (403), and continues with receiving a first data message stream at step (405), for example data message stream (121), followed by testing a timer value to determine whether a first time period (175) has elapsed (timer≧t1) at step (407). From above, this first time period (175) is selected to be longer than the corresponding retransmission interval (124) and hence assure the opportunity to receive any retransmission of a data message where an earlier transmission of the data message may have been missed. If the first time period (175) has not elapsed, the flow again loops back to step (405), and if the first time period (175) has elapsed, subsequent to resetting the timer at step (417), monitoring a second data message stream begins at step (419). The beginning of step (419) corresponds to the end of the first time period (175) and the beginning of the second time period (177) associated with the resultant data message stream (173) of FIG. 2.

Step (419) includes receiving a second data message stream, for example the data message stream (101) at step (421), assessing a second data error rate at step (423), and deciding whether the second data error rate satisfies a search threshold at step (425). When the search threshold is satisfied at step (425), indicating the second data message stream (101) includes a path with at least acceptable quality, registration on the second subnetwork is undertaken at step (429). Upon registration the portable station (61) may, for example, remain monitoring the second data message stream (101) for data messages intended for the portable station (61) or optionally as indicated by flow line (435) return to the beginning of the flow chart at step (403) and presumably await further directions, via a control message as above, from the network controller.

When the search threshold at step (425) is not satisfied the path labeled "N" (430) is followed to step (431) where the timer is tested to determine whether a second time period has elapsed (timer≧12). Ignoring one switch time (179) the second time period of step (431) is, for example, the equivalent of the second time period (177) of FIG. 2 and is selected according to the above identified constraints. If the timer condition of step (431) is not fulfilled the flow loops back and receiving a second data message stream is continued at step (419). Alternatively, when the timer condition of step (331) is fulfilled the path labeled "Y" (433) is taken back to step (403) where the process may begin anew. FIG. 4 is an exemplary embodiment of the instant invention for proactively directing data message delivery responsibilities for particular portable stations and corresponding data message traffic to a different subnetwork at any time it appears feasible. This may be particularly advantageous when the original registered subnetwork is an SFR subnetwork with limited capacity and the second subnetwork is an MFR subnetwork with relatively more capacity. Referring to FIG. 1, such circumstances could be present, for example, if a portable station traveled from location (63), served only by the SFR subnetwork (17), to location (65 or 67), served by either subnetwork.

The above descriptions and diagrams for the sake of clarity, simplicity and furthering an appreciation of the instant invention have been limited to the situation of only two (one registered) distinct subnetworks. Those skilled in the art will appreciate that the instant invention may be extended to more complex situations including three or more subnetworks so long as the first and second time period constraints, detailed above, are satisfied. Essentially, during the second time period (155 or 177), depending on the registered subnetwork, a portable station may receive for each of multiple portions of the second time period one of multiple nonregistered subnetworks, etc. etc. and thus extend the operation of the instant invention to more complex circumstances.

As described above, an inventive data communications system and method that automatically provides seamless data message delivery to a user regardless of network configuration has been shown.

What is claimed is:

1. A radio data communications system operating on multiple radio channels and coordinated by a network controller, the system adapted for data message delivery to portable stations throughout a geographic area, comprising in combination:

first sub-network means, coupled to the network controller and operating in a multi-frequency reuse mode, for transmitting a first data message stream that includes multiple transmissions of a data message temporally spaced by a retransmission interval;

second sub-network means, coupled to the network controller and operating in a single frequency reuse mode, for transmitting a second data message stream; and receiving means, included with a portable station, for receiving said first data message stream for a first time period that exceeds said retransmission interval, assessing a first data error rate, and, when said first data error rate satisfies a search threshold, temporarily receiving said second data message stream for a second time period that is less than said retransmission interval, thus assuring that no more than one of said multiple transmissions occur during said second time period.

2. In a radio data communications system operating on multiple radio channels and coordinated by a network controller, the system adapted for data message delivery to portable stations throughout a geographic area, a method practiced at a portable station including the steps of:

receiving a first data message stream for a first time period, said first data message stream corresponding to a first sub-network and including multiple transmissions of a data message temporally spaced by a retransmission interval that is less than said first time period;

assessing a first data error rate of said first data message stream; and monitoring, when said first data error rate satisfies a search threshold, a second data message stream for a second time period that is less than said retransmission interval said second data message stream corresponding to a second sub-network thus assuring that no more than one of said multiple transmissions occur during said second time period.

3. A method in accordance with claim 2 wherein said second data message stream corresponds to a single frequency reuse sub-network.

4. A method in accordance with claim 3 further including the step of assessing a second data error rate of said second data message stream.

5. A method in accordance with claim 4 further including the step of registering on said single frequency reuse sub-network when said first data error rate satisfies an exit threshold and said second data error rate satisfies said search threshold, thus redirecting data message delivery to said single frequency reuse sub-network.

6. In a radio data communications system operating on multiple radio channels and coordinated by a network controller, the system adapted for data message delivery to portable stations throughout a geographic area, a method practiced at a portable station including the steps of:

receiving a first data message stream for a first time period, said first data message stream corresponding to a single frequency reuse sub-network and including multiple transmissions of a data message temporally spaced by a retransmission interval that is less than said first time period;

monitoring a second data message stream for a second time period that is less than said retransmission interval, said second data message stream corresponding to a second sub-network, thus assuring that no more than one of said multiple transmissions occur during said second time period;

assessing a data error rate of said second data message stream during said second time period; and registering on said second sub-network when said data error rate satisfies a search threshold, thus proactively directing data message delivery to said second sub-network.

* * * * *

UNITED STATES PATENT AND TRADEMARK OFFICE
CERTIFICATE OF CORRECTION

PATENT NO. : 5,410,752
DATED : April 25, 1995
INVENTOR(S) : Christopher Scholefield It is certified that error appears in the above-identified patent and that said Letters Patent is hereby corrected as shown below:

On the title page item [73],
    insert --Assignee: Motorola, Inc., Schaumburg, Ill.--

Signed and Sealed this

Thirty-first Day of October 1995

Attest:

BRUCE LEHMAN

*Attesting Officer*     *Commissioner of Patents and Trademarks*